United States Patent [19]
Bobst

[11] 3,721,161

[45] March 20, 1973

[54] AXIAL PISTON HYDRAULIC APPARATUS

[75] Inventor: Gerhard Bobst, Oensingen, Switzerland

[73] Assignee: Von Roll AG, Gerlafingen, Switzerland

[22] Filed: Dec. 24, 1970

[21] Appl. No.: 101,362

[30] Foreign Application Priority Data

Dec. 30, 1969 Switzerland..........................19443/69

[52] U.S. Cl.......................91/486, 91/499, 92/DIG. 2, 308/35
[51] Int. Cl............................F01b 3/00, F01b 13/04
[58] Field of Search...........92/DIG. 2; 91/486, 499; 308/35, 233

[56] References Cited

UNITED STATES PATENTS 2,941,853  6/1960  Bartholomous.......................308/233
2,525,979  10/1950  Vickers...................................91/486

Primary Examiner—Paul L. Maslousky
Attorney—Flynn & Frishauf

[57] ABSTRACT

To decrease mechanical loading on the roller thrust bearings in hydraulic pressure fluid apparatus, a hydrostatic axial slide bearing is provided, having a rotating part with an axially directed face secured to the rotating elements of the apparatus; and a stator part, formed as an axially movable element, such as a piston, within a cylinder which has pressure fluid applied thereto from a pressure fluid tap of the apparatus, the piston being formed with an opening, preferably including a choke, through which pressure fluid is applied in the region between the piston and the axially facing surface of the rotor element, to provide a counterforce against the mechanical force exerted against the thrust bearing.

13 Claims, 4 Drawing Figures

AXIAL PISTON HYDRAULIC APPARATUS

The present invention relates to hydraulic pressure apparatus and more particularly to hydraulic pressure apparatus of the axial piston type having a drive shaft which is located within the housing of the apparatus in a bearing formed as a roller-thrust bearing.

Axial piston hydraulic units, such as swash-plate, or wobble plate hydraulic pumps, or hydraulic motors customarily have a drive shaft which is journalled in the housing by means of bearings forming a rolling-type contact, such as roller bearings, ball bearings and the like. Since the drive shaft of such hydraulic units is, however, subject to axial force, bearings must be provided which are capable of accepting axial force, thus, must be of the thrust bearing kind. Thus, an axial-type bearing must be associated with the shaft of the unit. In many practical elements, tapered roller bearings are used to provide for holding the rotating elements in lateral, as well as axial direction and to accept forces transmitted in lateral, as well as axial direction while providing for relative rotation.

The operating life of the bearings for the drive shaft depends essentially on the life of the bearing which accepts axially directed forces. It has therefore been suggested to make the axial bearings so strong and of such size and effectiveness that their lifetime is substantially increased. Additionally, arrangements have been proposed in which the speed, or the force transmitted by the various rolling-contact axial bearings are decreased, or split, for example by providing a plurality of bearings with suitable force-accepting surfaces for the various single bearings. These arrangements, as well as gearing to decrease the speed with which the rotating portion of the bearing has to run may use the operating hydraulic pressure existing within the hydraulic unit. Hydrostatic axial sliding bearings have been proposed in which operating fluid, taken from the pressure side of the hydraulic unit is supplied to the axial bearing to provide lubrication thereto, or to provide counteracting forces directly from the hydraulic pressure supply.

Known structures of this type are complicated and require a substantial number of separate parts, since additional devices and elements must be provided depending on operating conditions, or, since the bearings themselves must be formed as multiple bearing sub-assemblies. These separate bearings of the subassemblies, and the separate elements frequently require non-standard parts.

It is an object of the present invention to provide an arrangement to relieve the axial thrust on rolling-contact type bearings and thus increase the effectiveness of the hydraulic unit, which is simple to construct, requires no additional space in the hydraulic unit itself and is reliable in operation.

SUBJECT MATTER OF THE PRESENT INVENTION

Briefly, the rotating element is retained in a housing by a rolling-contact bearing; to accept axial thrust, a hydrostatic axial slide bearing is provided having a non-rotating bearing element stationary in the housing with respect to the rotating unit, and a rotatable bearing element, rotatable with the unit or the shaft; hydrostatic fluid is derived from the pressure side of the hydraulic unit and conducted in the region between the two bearing elements of the axial slide bearing to provide for counterpressure and relief of axial force acting on the bearing for the drive shaft.

In a preferred form, the stationary bearing element is slightly axially movable to provide, together with the housing or a suitable portion thereof, a cylinder-piston arrangement. Hydraulic pressure fluid is supplied between the cylinder and piston, the axially movable part of the stationary element being formed with openings therethrough, which may include a choke, to supply the pressure fluid to the space between the rotating element of the axial slide bearing and the axially-movable part of the stationary element. The axially movable element is preferably a stator ring, a movable cylinder portion of the cylinder-piston arrangement, the piston being formed directly by the housing or seating against a portion of the housing.

The invention will be described by way of example with reference to the accompanying drawings, wherein.

Figure 1:
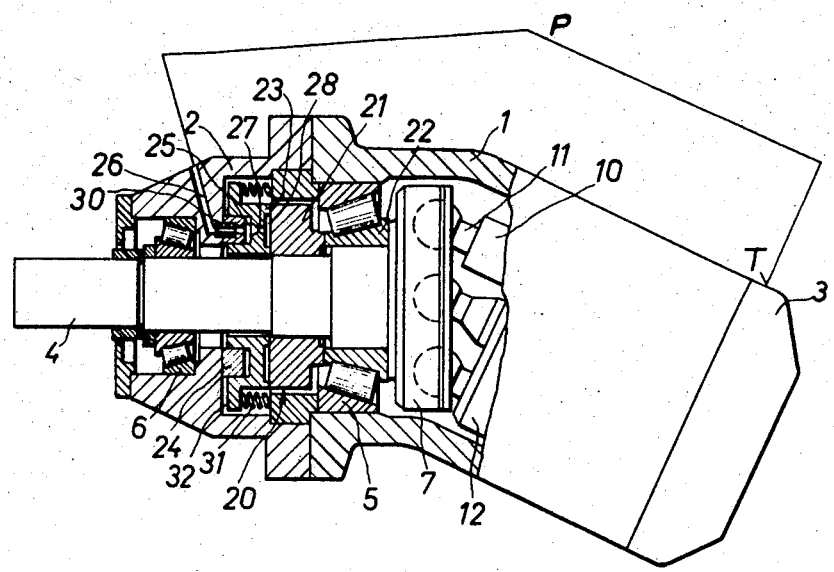
FIG. 1 is an axial piston hydraulic unit of the swash-plate type, partly in section, in which the drive shaft is retained by a pair of tapered roller bearings and having an axial hydrostatic slide bearing.

Embodiment of FIG. 1: An axial piston unit of the swash-plate type and of fixed angle inclination has a central housing portion 1, a top housing portion 2 and a bottom 3. Drive shaft 4 is retained in the housing by a pair of tapered roller bearings 5, 6, bearing 5 being located in central housing part 1 and bearing 6 in the end housing part 2. The cylinder itself can be retained in the housing in a well-known manner. Drive shaft 4 is formed with a transverse flange 7 to which a plurality of piston elements 10 are secured by means of ball-sockets, the pistons operating in the cylinder block 12. The ball ends of the pistons 10 are relieved below their sockets as seen at 11, to permit free movement of the pistons.

The hydrostatic axial bearing 20 is located between the two tapered roller bearings 5, 6. The axial bearing 20 includes a rotor ring 21, fixed to the drive shaft 4, and bearing, axially, against the inner race 22 of the tapered bearing 25. The rotor ring 21 cooperates with a stator ring 23 which, at the side opposite to the rotor 21, cooperates with a ring-shaped projection forming a piston 24, which engages in a matching groove 25 of the stator ring 23. Groove 25 and projection 24 form a cylinder piston arrangement. The piston 24 can be built in ring-form, to be in the shape of a ring-type piston, the groove 25 then forming the cylinder and being shaped as a circular ring groove; instead of a ring, circumferentially encircling drive shaft 4, the piston and cylinder arrangement can be formed as sectors, or plugs engaging in suitable openings forming the cylinder 25.

The hydrostatic bearing 20 has operating pressure from the hydraulic supply applied thereto. A tap point T, schematically indicated as being connected to the bottom 3 of the housing is connected by a hydraulic pressure line P to an inlet line 26. The tap point T can be formed in the housing at any convenient location where hydraulic fluid under pressure is available, or can be connected to a hydraulic pressure operating line connected to the unit. Pressure fluid is conducted from the line 26 to the piston 24 and through the piston in the groove 25 forming the cylinder between the piston 24 and the stator ring 23. Openings 27 are formed through the stator ring 23. The stator ring 23 itself has a small relief therein at the side facing the rotor ring 21, to form a small pocket 28 into which the fluid can be supplied. The combination of the axially directed face of the stator ring 23, with its pocket (which may be a ring-notch or groove) and the surface of rotor ring 21 facing the stator ring 23 forms a hydrostatic axial bearing. The operation of the bearing itself can be controlled by placing chokes or constrictions in the ducts 27. The pressure line 26 is connected to the piston 24 by a sealing element 30. To provide for safety in case of failure of pressure, springs 31 are interposed between a shoulder 32 of the stator ring and a shoulder formed on, or connected with the housing, so that the rotor ring and the stator ring will be slightly separated. Thus, upon loss of hydraulic pressure fluid, rotor and stator rings will not bind against each other.

The hydrostatic bearing thus is formed by a hydrostatic axial bearing arranged between rotor ring 21 and stator ring 23 and a piston-cylinder arrangement formed by the stator 23 on the one hand and by a ring-shaped member 24 bearing against the housing wall on the other. The cylinder-piston arrangement of elements 23, 24 provides for axial fit of the hydrostatic bearing 20 independently of the axial position of the flange 4 driving the operating pistons 11 and cylinder 12. When the unit operates, an axial force is applied on the pistons, and hence on flange 7 which is mechanically transmitted over bearing 5 to the housing part 2. Simultaneously, hydrostatic pressure is applied over line P and duct 26 so that the hydrostatic bearing will be subjected to pressure and provide, against rotor ring 21, an axial force against the inner race 22 of the bearing 5. Bearing 5 is thus unloaded, that is, the axial force thereagainst is relieved by the hydraulic counterpressure, so that the outer race of bearing 5 will have less axial force to transmit. Depending upon the counteracting hydraulic pressure, and the axial position of bearing 5, the stator ring 23 may move slightly in axial direction. This movement is slight, and reference to the stator ring 23 as "stationary" is deemed to refer to non-rotation thereof.

As soon as operating pressure is applied to the bearing 20, so that pressure will be applied to the cylinder-piston arrangement 21, 23, the springs 31 will be unloaded due to pressure fluid passing through openings 27, and the stator and rotor rings 21, 23 are placed into their proper relationship. The combination of the hydrostatic bearing with the cylinder-piston arrangement 21, 23 provides a simple and reliable counteraction against axial thrust due to operation of the hydraulic unit. The counteracting axial force will depend on the hydraulic operating pressure; any remaining, small axial forces can readily be accepted by bearings 5, 6.

Figure 2:
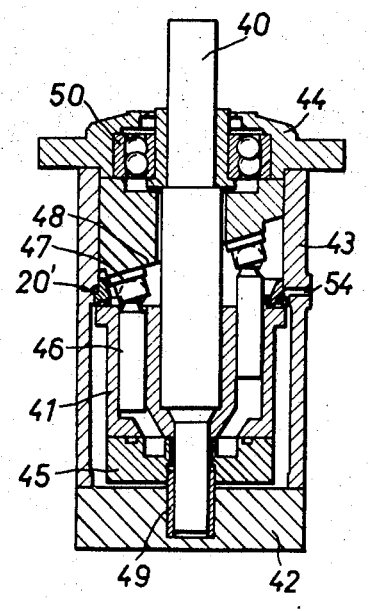
FIG. 2 is cross-sectional view through a swash-plate axial piston hydraulic unit having a slide bearing and a ball bearing and an additional axially directed hydrostatic bearing.
Figure 3:
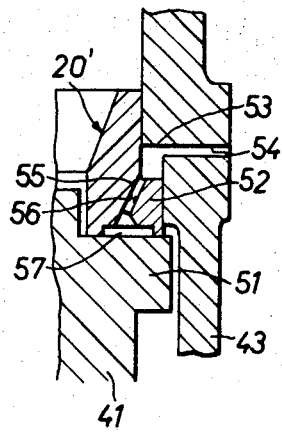
FIG. 3 is a fragmentary longitudinal view of a portion of the hydrostatic bearing to a greatly enlarged scale.

Embodiment of FIGS. 2 and 3: The axial bearing 20' of FIGS. 2 and 3 has its axial force acting directly against cylinder block 41, which is secured to shaft 40. The hydraulic unit of FIGS. 2 and 3 is of the wobble-plate type having a fixed displacement volume. The bottom 42 of the housing is connected to a housing jacket 43, which, in turn, is connected to a top cover 44, by means well known in the art. A fixed control plate having an inclined surface 48 is located within the housing; the drive shaft 40 is connected to the cylinder block 41 having pistons slidable therein, bearing by means of shoes 47 against inclined surface 48. Upon rotation of the cylinder, the pistons will be moved in and out as they slide against the inclined surface 48. Shaft 40 is journalled by means of a slide bearing 49 and a ball bearing 50. The resulting axial force in units of this type acts upwardly, that is axially in the direction of bearing 50. Thus, the axial bearing 20' must provide a corresponding oppositely directing axial force.

Axial bearing 20' is formed of a hydrostatic axial slide bearing with an intermediate piston. A collar 51 on the cylinder block 40 forms the rotor surface for the axial bearing. The stator 52 is formed as a ring-shaped piston which cooperates with wall 43, which has an internally directed shoulder 53 of the housing. Operating pressure is supplied by line 54, connected to a line similar to line P of FIG. 1 (not shown in FIG. 2). Operating fluid then passes through duct 55 extending through the piston 52 to supply the pockets 57 of the axial bearing. A choke, or constriction 56 throttles the fluid being supplied to the pockets 57.

The operation of bearing 20' is similar to that of bearing 20. Counterforce, in axial direction, is provided to relieve the axial loading on bearing 50. The counterforce is proportional to the pressure of the hydraulic fluid admitted through line 54 times the effective piston surface. The bearing 20' operates equally reliably. Stator 52 can be secured by means of springs 31 to slightly space the stator ring 52 from the shoulder 51 on the cylinder in the absence of hydraulic pressure.

Figure 4:
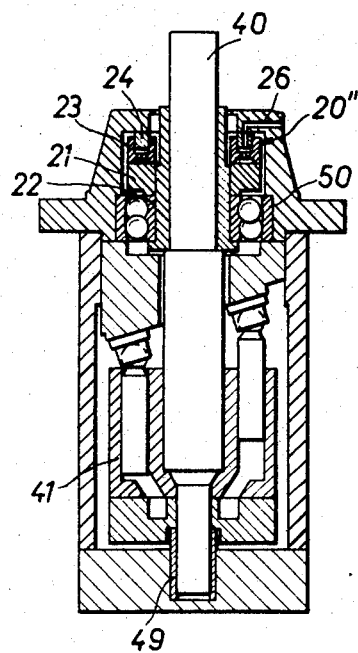
FIG. 4 is a longitudinal sectional view through an axial piston hydraulic unit having a slide bearing and a ball bearing and an axial hydrostatic bearing located beyond the ball bearing.

Embodiment of FIG. 4: A wobble-plate type unit with fixed supply volume has bearings 49, 50 as in FIG. 2; beyond bearing 50, an axial hydrostatic bearing 20'' is arranged which corresponds to bearing 20 of FIG. 1 in its detailed construction; it includes a rotor ring 21, a stator ring 23, a piston 24, and a supply line 26 connected, as in FIG. 1 to a tap point for hydraulic pressure fluid (omitted from FIG. 4 for simplicity of the drawing). The axial bearing 20'' provides a counter-directed axial force towards the cylinder block 41 and relieves the ball-bearing 50 by the axial force derived from bearing 20''.

The axial bearings have operating pressure applied thereto; by forming the axial bearings to includes an intermediate piston, the rolling contact bearings of the units are relieved from axial pressure, in that a counterforce, proportional to operating pressure, is provided. The arrangement is practically maintenance free and, by locating springs like springs 31 (FIG. 1), even loss of operating pressure will not cause destruction of any internal bearing surfaces. Upon loss of pressure, greater axial forces must be transmitted by the bearings already present. No additional structural elements are needed to incorporate the axial thrust bearing into the device, other than a single pressure fluid supply line, which supplies operating pressure fluid, directly and without intermediate chokes or valves to the axial hydrostatic bearing.

I claim:

1. In an axial piston hydraulic apparatus having a piston-cylinder unit (10, 12);
   a source of hydraulic pressure fluid (T);
   a housing (1);
   a drive shaft (4) extending through said housing;
   rolling contact bearing means (5, 50) mounted in said housing and guiding the rotational movement of said shaft in said housing;
   and a hydrostatic slide bearing (20, 20', 20''), said apparatus comprising
   a rotatable bearing element (21, 51) rotatable with the shaft (4) and having a surface transverse to the direction of axial thrust on the shaft;
   a ring-shaped non-rotatable bearing element (23, 52) fitted into the housing and having one surface facing the surface of said rotatable bearing element and an opposite surface facing the inside of the housing;
   means (26, 30, 54) introducing pressure fluid from said source into the housing and against said opposite surface of the non-rotatable bearing element, the housing forming conjointly with said non-rotatable bearing element a cylinder-piston arrangement (23, 24);
   and pressure fluid conduction means (27, 55) including choke means (55) formed in the pressure fluid conducting means extending in axial direction through said ring-shaped non-rotatable bearing element (23, 52) and introducing pressure fluid between the transverse surface of the rotatable bearing element and one facing surface of the non-rotatable bearing element to provide for axial counter pressure and unloading force acting on the roller bearing.

2. Apparatus according to claim 1, including a relief pocket (28, 57) formed in a facing axially directed surface of one of said bearing elements.

3. Apparatus according to claim 1, wherein the non-rotatable bearing element (23, 52) comprises a stator ring (23, 52);
   said housing and said stator ring being shaped to form said cylinder-piston arrangement, said stator ring forming the cylinder components of said cylinder-piston arrangement, the other component being formed by the housing (2, 43), said stator ring being separated from the rotatable element by hydrostatic force.

4. Apparatus according to claim 1, wherein the piston of the cylinder-piston arrangement is a ring projecting in axial direction between the housing and said non-rotatable bearing element.

5. Apparatus according to claim 1, wherein a plurality of cylinder-piston arrangements are provided.

6. Apparatus according to claim 1, wherein the rolling contact bearing means (5) is formed with an inner race (22) rotating with said shaft (4);
   and said rotating bearing element (21) of the hydrostatic bearing rotatable with the shaft (4) is axially supported against said inner race (22).

7. Apparatus according to claim 1, wherein the cylinder unit (41) is rotatable and has an end face;
   the rotatable bearing element (51) of the slide bearing (20') is formed by the end face of the cylinder unit;
   and wherein the ring-shaped non-rotatable bearing element (52) of the slide bearing is a ring-shaped member which has a facing surface opposite the end face of the cylinder unit, said housing (43) and ring-shaped bearing element (52) having overlapping, interengaging portions (53) to form a stepped cylinder-piston arrangement.

8. Apparatus according to claim 1, wherein the slide bearing (20'') is located beyond the roller contact bearing means (50) retaining and guiding the shaft (40) in the housing.

9. Apparatus according to claim 1, including auxiliary spring means (31) separating the non-rotatable element (23) slightly, in axial direction, from the rotating element (21), said spring means bearing against said non-rotatable element and against the housing.

10. Apparatus according to claim 1, wherein the non-rotatable element (23, 52) of the hydrostatic axial bearing is slightly axially movable in the housing and located therein to be guided axially thereby.

11. Apparatus according to claim 10, wherein an axially extending chamber is formed between said opposite surface of the non-rotatable element and the housing, and separating said non-rotatable element and the housing, said chamber, the adjacent portion of the housing and the non-rotatable element forming said piston-cylinder arrangement.

12. Apparatus according to claim 11, wherein the pressure fluid conduction means comprises at least one opening formed in said axially movable element communicating with said chamber.

13. Apparatus according to claim 12, wherein the means introducing pressure fluid from said source into the housing are connected into said chamber, said at least one opening supplying hydraulic fluid, under pressure, from the chamber to the region between the rotatable element and the slightly axially movable element.

* * * * *